United States Patent
Hu et al.

(10) Patent No.: US 11,709,853 B2
(45) Date of Patent: Jul. 25, 2023

(54) DATABASE-BASED MANAGEMENT METHOD, PLATFORM, ELECTRONIC DEVICE AND STORAGE MEDIUM

(71) Applicant: Beijing Baidu Netcom Science and Technology Co., Ltd., Beijing (CN)

(72) Inventors: Linsen Hu, Beijing (CN); Suozhu Li, Beijing (CN); Ziyi Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/204,804

(22) Filed: Mar. 17, 2021

(65) Prior Publication Data
US 2021/0406275 A1 Dec. 30, 2021

(30) Foreign Application Priority Data
Jun. 30, 2020 (CN) .......................... 202010618456.X

(51) Int. Cl.
G06F 16/00 (2019.01)
G06F 16/25 (2019.01)
(Continued)

(52) U.S. Cl.
CPC .......... *G06F 16/252* (2019.01); *G06F 16/215* (2019.01); *G06F 16/23* (2019.01)

(58) Field of Classification Search
CPC ........ G06F 21/105; G06F 21/51; G06F 21/57; G06F 2211/007; G06F 8/61; G06F 8/65;
(Continued)

(56) References Cited

U.S. PATENT DOCUMENTS

| 10,776,175 B1 | 9/2020 | Shau et al. |
| 2001/0056461 A1 | 12/2001 | Kampe et al. |

(Continued)

FOREIGN PATENT DOCUMENTS

| CN | 111104282 A | 5/2020 |
| JP | 2009110439 A | 5/2009 |

(Continued)

OTHER PUBLICATIONS

Extended European Search Report Issued in European Patent Application No. 21163191.6, dated Aug. 31, 2021, 8 Pages.

(Continued)

*Primary Examiner* — Shyue Jiunn Hwa
(74) *Attorney, Agent, or Firm* — Kwan & Olynick LLP

(57) ABSTRACT

The present disclosure provides a database-based management method, platform, electronic device and storage medium, which relates to the technical field of databases and may be used for a cloud computing scenario. A specific implementation solution is as follows: monitoring a plurality of nodes through which an application accesses a corresponding database cluster based on pre-built management information of the corresponding database cluster of the application; when an abnormal node appears in the plurality of nodes, sending a node creation request carrying information of the abnormal node to a task management platform, to create an alternative node with the same function to replace the abnormal node; receiving information of the created alternative node returned from the task management platform; updating the management information of the database cluster of the application based on the information of the alternative node and the information of the abnormal node. In the present disclosure, only one set of database management platform is needed no matter whether the architectures of database clusters corresponding to the applications are the (Continued)

same. The above solution can be used to manage all applications simultaneously and effectively improve the management efficiency of the databases.

16 Claims, 8 Drawing Sheets

(51) Int. Cl.
*G06F 16/23* (2019.01)
*G06F 16/215* (2019.01)

(58) Field of Classification Search
CPC .. G06F 16/22; G06F 16/2272; G06F 16/2329; G06F 16/2343; G06F 16/235; G06F 16/2471; G06F 16/256; G06F 16/273; G06F 21/10; G06F 2221/0773; G06F 2221/2135; G06F 2221/2137; G06F 9/4881; G06F 9/5061; G06F 9/5088; G06F 16/2228; G06F 15/16; G06F 16/2282; H04L 67/01; G06Q 30/06
See application file for complete search history.

(56) References Cited

U.S. PATENT DOCUMENTS

| | | |
|---|---|---|
| 2009/0113034 A1 | 4/2009 | Krishnappa et al. |
| 2014/0317206 A1 | 10/2014 | Lomelino et al. |
| 2015/0261580 A1 | 9/2015 | Shau et al. |
| 2015/0264119 A1 | 9/2015 | Shau et al. |
| 2015/0264122 A1 | 9/2015 | Shau et al. |
| 2016/0352588 A1 | 12/2016 | Subbarayan et al. |
| 2017/0116315 A1* | 4/2017 | Xiong ................ G06F 16/2228 |
| 2019/0347352 A1 | 11/2019 | Gochkov et al. |
| 2020/0272614 A1* | 8/2020 | Yang ..................... G06Q 30/06 |
| 2021/0034471 A1 | 2/2021 | Khandkar et al. |

FOREIGN PATENT DOCUMENTS

| | | |
|---|---|---|
| JP | 2013073419 A | 4/2013 |
| JP | 2019040292 A | 3/2019 |
| WO | 2019168859 A2 | 9/2019 |

OTHER PUBLICATIONS

EPO Communication pursuant to Article 94(3) EPC for EP21163191.6 dated Jul. 18, 2022, 8 pages.
First Office Action for JP2021-107158 dated Aug. 26, 2022, 3 pages.
First Korean Office Action for KR10-2021-0084322, dated Jan. 3, 23, 16 pgs.
Summons to attend oral proceedings pursuant to Rule 115(1) EPC, dated Dec. 13, 22 for EP21163191.6, 13 pgs.
Decision of Rejection for 2021-107158, dated Mar. 7, 2023, 2 pgs.

* cited by examiner

DATABASE-BASED MANAGEMENT METHOD, PLATFORM, ELECTRONIC DEVICE AND STORAGE MEDIUM

The present application claims the priority of Chinese Patent Application No. 202010618456.X, filed on Jun. 30, 2020, with the title of "Database-based management method, apparatus, electronic device and storage medium". The disclosure of the above application is incorporated herein by reference in its entirety.

FIELD OF THE DISCLOSURE

The present disclosure relates to the technical field of computers and specifically to the technical field of databases, may be used for a cloud computing scenario and particularly relates to a database-based management method, platform, electronic device and storage medium.

BACKGROUND OF THE DISCLOSURE

In the prior art, the same database provider might provide tens of types of database products. Each type of database products requires a management platform to perform daily management operations for the database products with a high availability. A set of management platform is designed and implemented for each database product. Furthermore, the same database product architecture might vary in different cloud scenarios, in companies, and in public or private cloud scenarios. Different management platforms might be needed to manage the database products. The database product may be a database or a database cluster for providing applications with database service.

Since different database products even the same type of database products in the prior art have inconsistent architectures under different cloud scenarios, various different database management platforms need to be maintained in research and development, the same function is developed repeatedly, and meanwhile, operation and maintenance needs to be applicable for operation and maintenance differences caused by the different architectures. Meanwhile, this does not facilitate technical iteration and architecture innovation of the management platforms per se. Hence, the conventional solution exhibits a low database-based management efficiency.

SUMMARY OF THE DISCLOSURE

To address the above technical problems, the present disclosure provides a database-based management method, platform, electronic device and storage medium.

According to an aspect of the present disclosure, there is provided a database-based management method, wherein the method comprises:

monitoring a plurality of nodes through which an application accesses a corresponding database cluster based on pre-built management information of the corresponding database cluster of the application;

when an abnormal node appears in the plurality of nodes, sending a node creation request carrying information of the abnormal node to a task management platform, to create an alternative node with the same function to replace the abnormal node;

receiving information of the created alternative node returned from the task management platform;

updating the management information of the database cluster of the application based on the information of the alternative node and the information of the abnormal node.

According to another aspect of the present disclosure, there is provided a database-based management method, wherein the method comprises:

receiving a node creation request carrying information of an abnormal node and sent by a database management platform; the node creation request is sent by the database management platform upon determining there is the abnormal node upon monitoring a plurality of nodes through which the application access a corresponding database cluster based on pre-built management information of the database cluster of the application;

creating an alternative node with the same function for the application according to the information of the abnormal node, to replace the abnormal node;

returning information of the created alternative node to the database management platform so that the database management platform updates the management information of the database cluster of the application.

According to a further aspect of the present disclosure, there is provided an electronic device, comprising:

at least one processor; and a memory communicatively connected with the at least one processor;

wherein the memory stores instructions executable by the at least one processor, and the instructions are executed by the at least one processor to enable the at least one processor to perform a database-based management method, wherein the method comprise:

monitoring a plurality of nodes through which an application accesses a corresponding database cluster based on pre-built management information of the corresponding database cluster of the application;

when an abnormal node appears in the plurality of nodes, sending a node creation request carrying information of the abnormal node to a task management platform, to create an alternative node with the same function to replace the abnormal node;

to receiving information of the created alternative node returned from the task management platform;

updating the management information of the database cluster of the application based on the information of the alternative node and the information of the abnormal node.

According to a further aspect of the present disclosure, there is provided an electronic device, comprising:

at least one processor; and a memory communicatively connected with the at least one processor;

wherein the memory stores instructions executable by the at least one processor, and the instructions are executed by the at least one processor to enable the at least one processor to perform a database-based management method, wherein the method comprise:

receiving a node creation request carrying information of an abnormal node and sent by a database management platform; the node creation request is sent by the database management platform upon determining there is the abnormal node upon monitoring a plurality of nodes through which the application access a corresponding database cluster based on pre-built management information of the database cluster of the application;

creating an alternative node with the same function for the application according to the information of the abnormal node, to replace the abnormal node;

returning information of the created alternative node to the database management platform so that the database management platform updates the management information of the database cluster of the application.

According to a further aspect of the present disclosure, there is provided a non-transitory computer readable storage medium with computer instructions stored thereon, wherein the computer instructions are used for causing a computer to perform a database-based management method, wherein the method comprises:

monitoring a plurality of nodes through which an application accesses a corresponding database cluster based on pre-built management information of the corresponding database cluster of the application;

when an abnormal node appears in the plurality of nodes, sending a node creation request carrying information of the abnormal node to a task management platform, to create an alternative node with the same function to replace the abnormal node;

receiving information of the created alternative node returned from the task management platform;

updating the management information of the database cluster of the application based on the information of the alternative node and the information of the abnormal node.

According to a further aspect of the present disclosure, there is provided a non-transitory computer readable storage medium with computer instructions stored thereon, wherein the computer instructions are used for causing a computer to perform a database-based management method, wherein the method comprises:

receiving a node creation request carrying information of an abnormal node and sent by a database management platform; the node creation request is sent by the database management platform upon determining there is the abnormal node upon monitoring a plurality of nodes through which the application access a corresponding database cluster based on pre-built management information of the database cluster of the application;

creating an alternative node with the same function for the application according to the information of the abnormal node, to replace the abnormal node;

returning information of the created alternative node to the database management platform so that the database management platform updates the management information of the database cluster of the application.

According to the technical solutions of the present disclosure, a plurality of nodes through which all applications access the corresponding database cluster may be monitored, and when the abnormal node appears, the management information of the database cluster of applications can be updated in time based on the information of the created alternative node replacing the abnormal node, to facilitate continuing to monitor a plurality of nodes through which the applications access the corresponding database cluster to ensure that the applications can normally access the corresponding database cluster. In the present disclosure, only one set of database management platform is needed no matter whether the architectures of database clusters corresponding to the applications are the same. The above solution can be used to manage all applications simultaneously and effectively improve the management efficiency of the databases. Furthermore, different database architectures do not require development of different database management platforms, which can effectively save the development cost and facilitate iteration and innovation of the database management platform.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
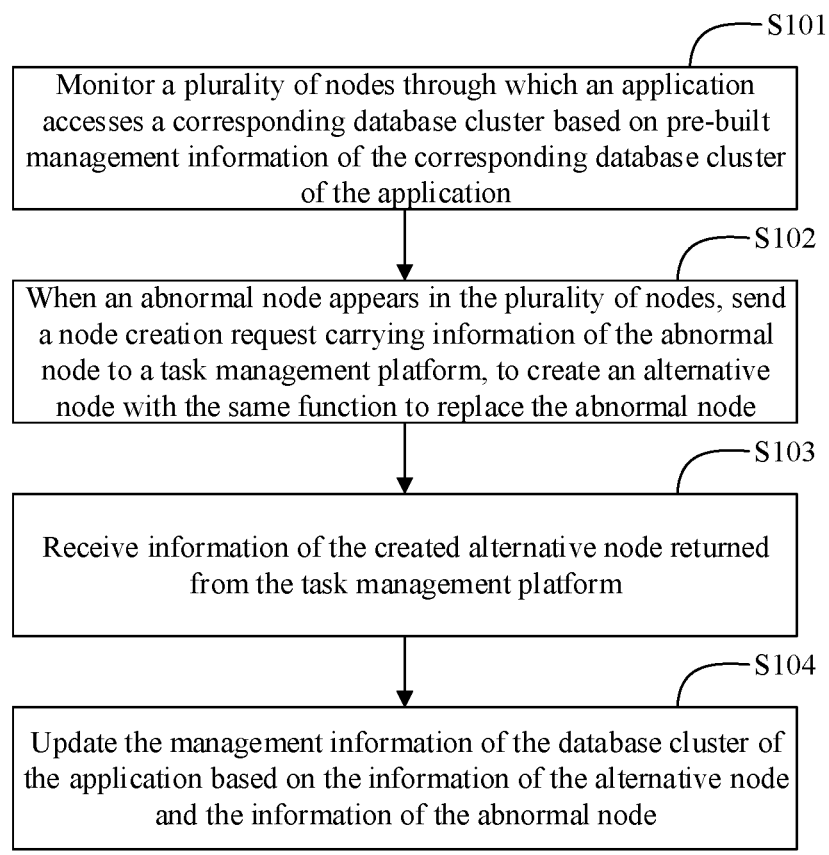
FIG. 1 illustrates a schematic diagram of a first embodiment according to the present disclosure.

FIG. 1 illustrates a schematic diagram of a first embodiment according to the present disclosure; as shown in FIG. 1, a database-based management method according to the present embodiment may specifically include the following steps:

S101: monitoring a plurality of nodes through which an application accesses a corresponding database cluster based on pre-built management information of the corresponding database cluster of the application;

S102: when an abnormal node appears in the plurality of nodes, sending a node creation request carrying information of the abnormal node to a task management platform, to create an alternative node with the same function to replace the abnormal node;

S103: receiving information of the created alternative node returned from the task management platform;

S104: based on the information of the alternative node and the information of the abnormal node, updating the management information of the database cluster of the application.

A subject for executing the database-based management method according to the present embodiment is a database management platform. The database management platform may perform unified management on database information of all applications, and can effectively improve the management efficiency of the database whatever architecture the database is under.

Specifically, the database is used to provide database service for the application. Based on the needs of the application, a database cluster of a desired sized may be configured for each application to achieve storage of all information of the application. Specifically, when the application accesses the corresponding database cluster, it does not access it directly, but accesses the stored database cluster through a plurality of intermediate nodes. Based on this, information of nodes accessing the node may be stored in the pre-built management information of the database cluster of the application. As such, the database management platform may monitor a plurality of nodes through which the application accesses the corresponding database cluster, based on the management information of the database cluster of the application. For example, monitoring in the present embodiment mainly means monitoring whether nodes are abnormal. If a node is abnormal, the application cannot access the corresponding database cluster through the node.

The database management platform of the present embodiment only achieves the function of managing the database. If the database management platform detects an operation task needs to be executed, the database management platform sends a task operation request to the task management task, and the task management platform executes the corresponding operation task. For example, when the database management platform of the present embodiment monitors, if it is determined that an abnormal node appears in the plurality of nodes, a node creation request carrying information of the abnormal node is sent to the task management platform, to create an alternative node with the same function to replace the abnormal node.

Furthermore, to ensure timely and accurate update of the management information of the database cluster of the application, in the present embodiment after the alternative node with the same function is created at the task management platform to replace the abnormal node, the information of the created alternative node needs to be returned to the database management platform. Correspondingly, the database management platform receives the information of the created alternative node returned by the task management platform; updates the management information of the database cluster of the application based on the information of the alternative node and the information of the abnormal node, so as to subsequently monitor a plurality of nodes through which the application accesses the corresponding database cluster, based on the management information of the database cluster of the application.

Any application is taken as an example in the present embodiment to describe the management of the database cluster of the application by the database management platform. In this example, in the manner stated in the present embodiment, the database management platform may implement centralized management of database clusters of all applications, i.e., only one database management platform can implement the management of the databases of all applications, effectively save the management cost and effectively improve the management efficiency of databases.

According to the database-based management method of the present embodiment, a plurality of nodes through which the application accesses the corresponding database cluster is monitored based on the pre-built management information of the database cluster of the application; if an abnormal node appears in the plurality of nodes, a node creation request carrying information of the abnormal node is sent to a task management platform, to create an alternative node with the same function to replace the abnormal node; information of the created alternative node returned from the task management platform is received; the management information of the database cluster of the application is updated based on the information of the alternative node and the information of the abnormal node. According to the technical solution of the present embodiment, a plurality of nodes through which all applications access the corresponding database cluster may be monitored, and when the abnormal node appears, the management information of the database cluster of applications can be updated in time based on the information of the created alternative node replacing the abnormal node, to facilitate continuing to monitor a plurality of nodes through which the applications access the corresponding database cluster to ensure that the applications can normally access the corresponding database cluster. In the present embodiment, only one set of database management platform is needed no matter whether the architectures of database clusters corresponding to the applications are the same. The above solution can be used to manage all applications simultaneously and effectively improve the management efficiency of the databases. Furthermore, different database architectures do not require development of different database management platforms, which can effectively save the development cost and facilitate iteration and innovation of the database management platform.

Further optionally, before step S101 of monitoring a plurality of nodes through which an application accesses a corresponding database cluster based on pre-built management information of the corresponding database cluster of the application, in the embodiment shown in FIG. 1, the method may further comprise: building the management information of the database cluster of the application based on the information of the plurality of nodes which are configured for the application and through which the application accesses the corresponding database cluster. That is, this step is used to implement the creation of the management information of the database cluster of the application. This solution corresponds to a scenario regarding the information of nodes which are already configured for the application offline and through which the application accesses the corresponding database cluster.

In addition, optionally, in the present embodiment, the plurality of nodes through which the application accesses the corresponding database cluster may include access entries, access proxies, storage slices and storage nodes in each storage slice.

The access entry may be an entry configured for the application to access the corresponding database cluster, for example, the access entry may be a VIP provided for the service of the application. For example, the access entry may be a Border Gateway (BGW) or a Domain Name System (DNS) for internal service; the access entry may be Load Balancing (LB) device or DNS for public cloud or private cloud.

The information of one access entry may correspond to a set of access proxies. The relationship of the access proxies in the set of access proxies is a peer relationship.

The database cluster may be divided into a plurality of storage slices. A plurality of storage nodes may be provided in each storage slice, and data stored in each storage node is consistent. One storage node is a master node, and other storage nodes are slave nodes. A storage slice may use a two-tuple description <nodes, nodes_relation>, namely, the relationship between the set of storage nodes and the storage nodes, where the relationship between the storage nodes is a master-slave relationship. The two-tuple description of the storage slice is referred to as topology and may be recorded in a configuration file of the access entry.

In addition, optionally, as for the database cluster corresponding to the application, authorization information on an account accessing the database cluster needs to be configured, for example, the authorization information may include: account information such as account name, password etc.; right information such as read from or write into authorized information of an entity; whitelist information such as IP and BNS. For example, the authorization information may also be stored in the management information.

At this time, correspondingly, building the management information of the database cluster of the application may specifically be: building the management information of the database cluster of the application based on the information of the access entries, proxies, storage slices and storage nodes which are configured for the application and through which the application accesses the corresponding database cluster.

At this time, correspondingly, step S101 may specifically be monitoring the access entries, proxies, storage slices and storage nodes through which the application accesses the corresponding database cluster, based on the pre-built management information of the database cluster of the application.

The above technical solution may be used to create the management information of the database cluster of the application based on the information of the nodes which are already configured for the application offline and through which the application accesses the database cluster, thereby facilitating monitoring the plurality of nodes through which the application accesses the corresponding database cluster based on the management information of the database cluster of the application, implementing the management of the process of the application accessing the database cluster, and effectively improving the management efficiency.

Figure 2:
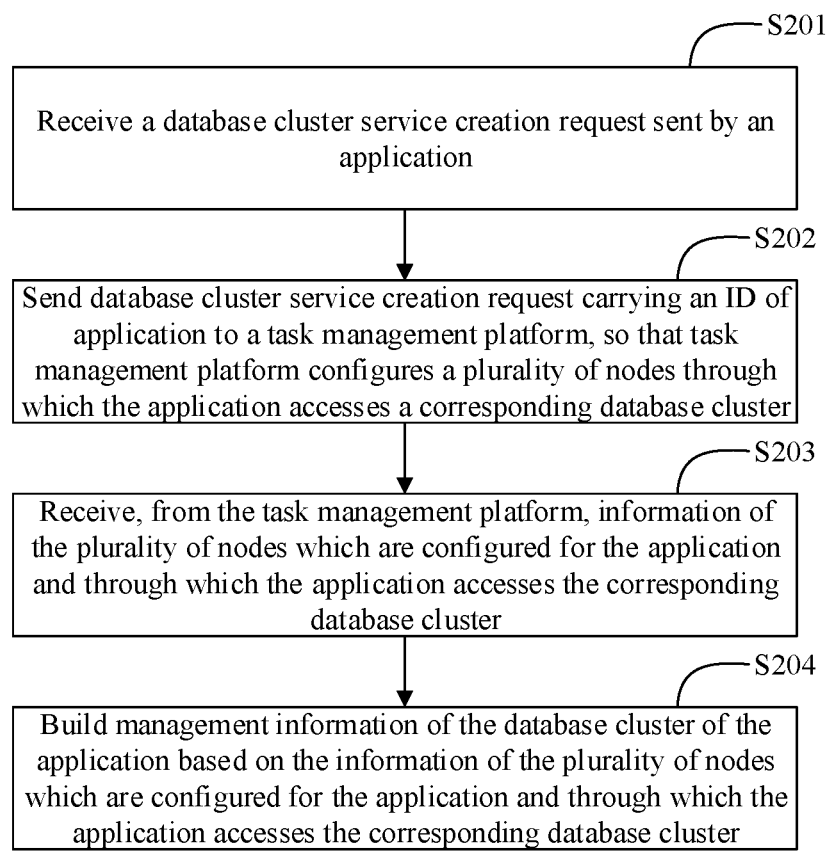
FIG. 2 illustrates a schematic diagram of a second embodiment according to the present disclosure.

FIG. 2 illustrates a schematic diagram of a second embodiment according to the present disclosure. As shown in FIG. 2, the technical solution of the database-based management method of the present embodiment will be further introduced in more detail on the basis of the above technical solution of the embodiment shown in FIG. 1. As shown in FIG. 2, the database-based management method according to the present embodiment may specifically include the following steps:

S201: receiving a database cluster service creation request sent by an application;

S202: sending the database cluster service creation request carrying an ID of the application to a task management platform, so that the task management platform configures for the application a plurality of nodes through which the application accesses a corresponding database cluster;

S203: receiving, from the task management platform, information of the plurality of nodes which are configured for the application and through which the application accesses the corresponding database cluster;

For example, the plurality of nodes of the present embodiment are the same as those of the previous embodiment. Correspondingly, information of the access entries, proxies, storage slices and storage nodes which are configured for the application and through which the application accesses the corresponding database cluster are received from the task management platform.

S204: building management information of the database cluster of the application based on the information of the plurality of nodes which are configured for the application and through which the application accesses the corresponding database cluster.

A subject for executing the database-based management method according to the present embodiment is still the database management platform.

The technical solution of the present embodiment specifically corresponds to a scenario in which database cluster services are configured for applications online through the database management platform.

Specifically, when an application wants to apply for the database cluster service, the application may send a database cluster service creation request to the database management platform. Likewise, in the present embodiment, the database management platform also only performs management and does not perform any task operation, e.g., the database cluster service creation. At this time, after receiving the database cluster service creation request, the database management platform sends the database cluster service creation request carrying the ID of the application to the task management platform so that the task management platform configures for the application a plurality of nodes through which the application accesses the corresponding database cluster. To facilitate the database management platform to build the management information of the database cluster of the application, after the task management platform configures for the application the plurality of nodes through which the application accesses the corresponding database cluster, information of the plurality of nodes which are configured for the application and through which the application accesses the corresponding database cluster needs to be returned to the database management platform. As such, the database management platform may build the management information of the database cluster of the application based on the information of the plurality of nodes which are configured for the application and through which the application accesses the corresponding database cluster, thereby achieving monitoring and management of the process of the application accessing the database cluster.

In addition, it needs to be appreciated that in the present embodiment, the database cluster service creation request sent by the application may carry the numbers of the access entries, proxies, storage slices and/or storage nodes. Correspondingly, at step S202, when the database management platform sends the database cluster service creation request carrying the ID of the application to the task management platform, the request needs to carry the numbers of the access entries, proxies, storage slices and/or storage nodes so that the task management platform, based on the numbers, configures, for the application, the information of the plurality of nodes through which the application accesses the corresponding database cluster.

In addition, optionally, if the database cluster service creation request sent by the application does not carry the numbers, the task management platform may configure, for the application, default numbers of access entries, proxies, storage slices and/or storage nodes based on a preset rule, and the application may subsequently further increase, delete or amend the numbers and information of the nodes.

According to the above technical solution of the database-based management method of the present embodiment, it is possible to perform processing for the database cluster service creation request sent from the application, build the management information of the database cluster of the application after receiving information of the plurality of nodes which are configured by the task management platform for the application and through which the application accesses the corresponding database cluster, and then implement effective management of the process of the application accessing the corresponding database cluster, based on the management information of the database cluster of the application.

Figure 3:
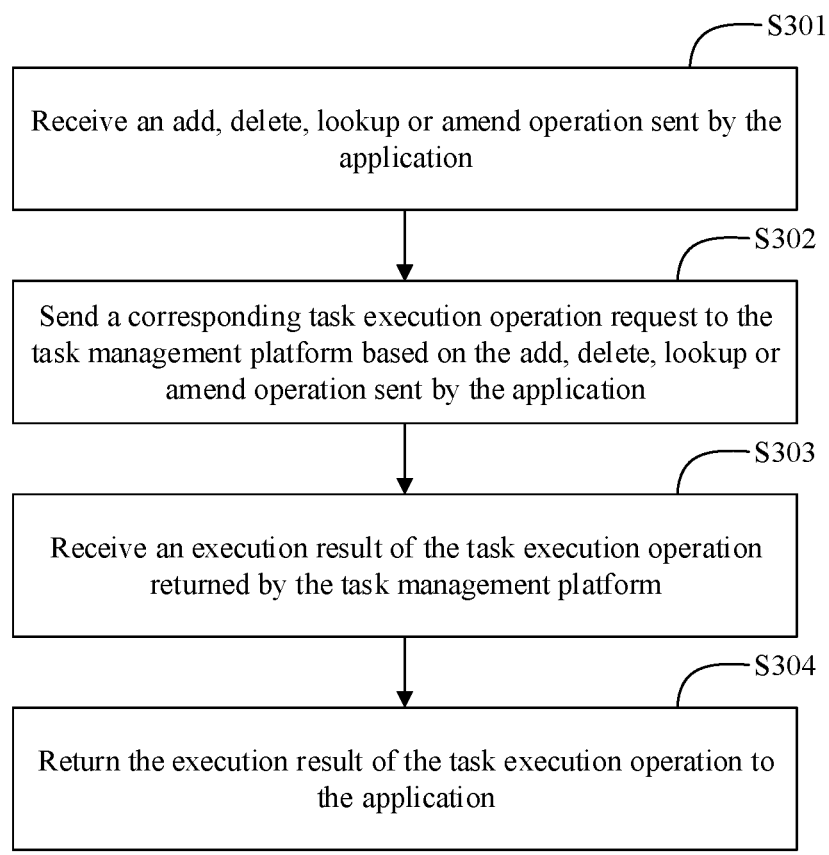
FIG. 3 illustrates a schematic diagram of a third embodiment according to the present disclosure.

FIG. 3 illustrates a schematic diagram of a third embodiment according to the present disclosure. As shown in FIG. 3, the technical solution of the database-based management method of the present embodiment will be further introduced in more detail on the basis of the above technical solution of the embodiment shown in FIG. 1. As shown in FIG. 3, the database-based management method according to the present embodiment may specifically include the following steps:

S301: receiving an add, delete, lookup or amend operation sent by the application;

S302: sending a corresponding task execution operation request to the task management platform based on the add, delete, lookup or amend operation sent by the application;

S303: receiving an execution result of the task execution operation returned by the task management platform;

S304: returning the execution result of the task execution operation to the application.

The add, delete, lookup or amend operation in the present embodiment may be an add, delete, lookup or amend operation for databases in the database cluster of the application or database entries.

Likewise, in the present embodiment, the database management platform is only used to implement management of the database cluster of the application, not to perform processing for any operation. For example, upon receiving the add, delete, lookup or amend operation sent by the application, the database management platform sends a corresponding task execution operation request to the task management platform, and the task management platform performs the task operation based on the task execution operation request, and returns the execution result of the task execution operation to the database management platform; the database management platform returns the execution result of the task execution operation to the application.

In addition, optionally, the add, delete, lookup or amend operation in the present embodiment may be an add, delete, lookup or amend operation for the nodes through which the application accesses the corresponding database cluster. At this time, it needs to be appreciated that if the add, delete, lookup or amend operation involves an add, delete or amend operation for the nodes through which the application accesses the corresponding database cluster, it is further possible to update the management information of the database cluster of the application based on the execution result of the task execution operation, to ensure the management information of the database clusters of all applications stored in the database management platform is always accurate without errors.

Specifically, if the execution result indicates that a certain node is already deleted, a certain node is added or a certain node is amended, the management information of the database cluster of the application needs to be updated in time so as to monitor the plurality of nodes through which the application accesses the corresponding database cluster based on the management information of the database cluster of the application according to the technical solution of the embodiment of FIG. 1

According to the above technical solution of the database-based management method of the present embodiment, it is possible to perform processing for the add, delete, lookup or amend operation for the application, and after the task management platform processes, obtain the execution result of the task execution operation returned by the task management platform, and return the execution result to the application. Furthermore, in the present embodiment, when the add, delete, lookup or amend operation for the application involves an add, delete or amend operation for the nodes through which the application accesses the corresponding database cluster, it is further possible to update the management information of the database cluster of the application based on the execution result of the task execution operation, to ensure the management information of the database clusters of all applications stored in the database management platform is always accurate without errors, thereby effectively improving the management efficiency of the databases.

Figure 4:
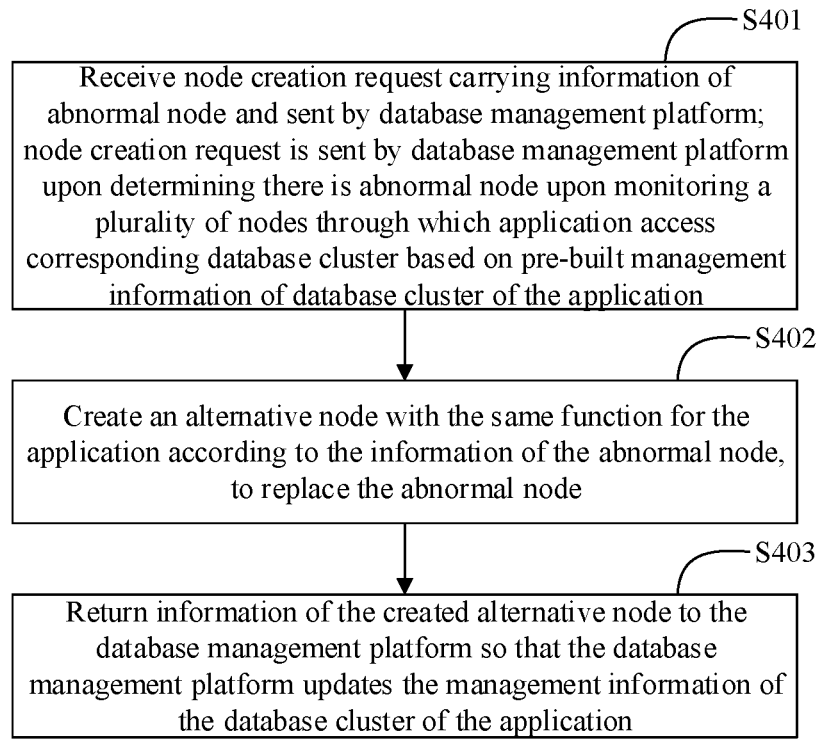
FIG. 4 illustrates a schematic diagram of a fourth embodiment according to the present disclosure.

FIG. 4 illustrates a schematic diagram of a fourth embodiment according to the present disclosure. As shown in FIG. 4, the database-based management method of the present embodiment may specifically include the following steps:

S401: receiving a node creation request carrying information of an abnormal node and sent by the database management platform; the node creation request is sent by the database management platform upon determining there is the abnormal node upon monitoring a plurality of nodes through which the application access the corresponding database cluster based on pre-built management information of the database cluster of the application;

S402: creating an alternative node with the same function for the application according to the information of the abnormal node, to replace the abnormal node;

S403: returning information of the created alternative node to the database management platform so that the database management platform updates the management information of the database cluster of the application.

A subject for executing the database-based management method of the present embodiment is a task management platform. The present embodiment differs from the embodiment shown in FIG. 1 in that the technical solution of the present disclosure is described on the side of the database management platform in the embodiment shown in FIG. 1, whereas the technical solution of the present disclosure is described on the side of the task management platform in the present embodiment. A specific implementation manner of the technical solution of the present embodiment is completely identical with the embodiment shown in FIG. 1. For details, please refer to the depictions of the embodiment shown in FIG. 1. No details will be provided here.

According to the technical solution of the database-based management method of the present embodiment, it is possible to assist the database management platform in processing a task operation, and feeding back an execution result of the task operation to the database management platform so that the database management platform can manage the database more effectively and thereby effectively improve the management efficiency of the database.

For example, step S402 in the embodiment shown in FIG. 4 may specifically comprise at least one type of the following:

(1) creating an alternative access entry for the application according to the information of an abnormal access entry, to replace the abnormal access entry;

When the access entry is created, an access entry of the same type as the abnormal access entry needs to be created. If the abnormal access entry is an DSN, the created alternative access entry must be an DSN to ensure the created alternative access entry has the same function as the abnormal access entry, to replace the abnormal access entry.

(2) according to information of an abnormal access proxy, selecting a proxy from a set of access proxies to which the abnormal access proxy belongs as an alternative proxy, to replace the abnormal access proxy;

In practical application, each access entry corresponds to one set of access proxies. The access proxy configured for a certain application is one, two or more access proxies in the set of access proxies. In the present embodiment, since a plurality of access proxies in the same set of access proxies have similar functions, when it is monitored that a certain set of access proxies gets abnormal, preferably an access proxy is acquired from the set of access proxies to which the abnormal proxy belongs as the alternative proxy, to replace the abnormal access proxy.

(3) according to information of an abnormal storage slice, reconstructing a storage slice identical with the abnormal storage slice as an alternative storage slice, to replace the abnormal storage slice;

Specifically, the data of the application is specifically stored on a certain storage node in the storage slice. Therefore, in an actual scenario, there is a small probability that the storage slice becomes abnormal. If the storage slice becomes abnormal, the same storage slice as the abnormal storage slice may be reconstructed according to the information of the abnormal storage slice, as the alternative storage slice.

(4) if a storage node in the storage slice as a master node becomes abnormal, obtaining a slave node from the storage slice and updating the slave node as a new master node, to replace the abnormal master node; and (5) if a storage node in the storage slice as a slave node becomes abnormal, reconstructing a slave node in the storage slice to replace the abnormal slave node.

When the alternative node is created, if the master node in the storage slice becomes abnormal, a slave node in the storage slice is updated as the master node as the alternative master node. If a slave node becomes abnormal, another slave node is reconstructed to replace the abnormal slave node.

According to the above technical solution, the alternative node with the same function can be created when a node becomes abnormal to ensure the application can normally access its corresponding database cluster.

Figure 5:
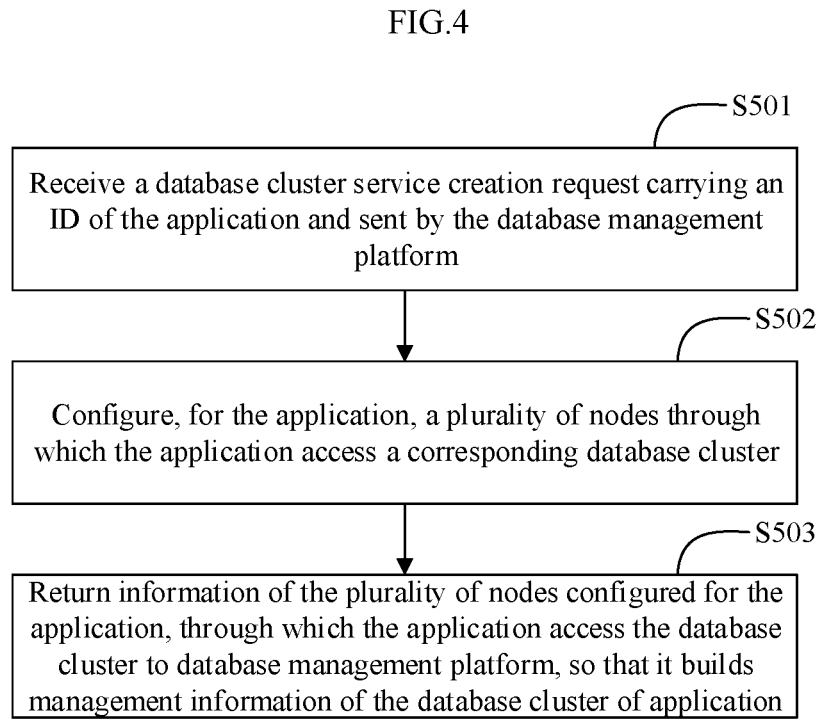
FIG. 5 illustrates a schematic diagram of a fifth embodiment according to the present disclosure.

FIG. 5 illustrates a schematic diagram of a fifth embodiment according to the present disclosure. As shown in FIG. 5, the technical solution of the database-based management method of the present embodiment will be further introduced in more detail on the basis of the above technical solution of the embodiment shown in FIG. 4. As shown in FIG. 5, the database-based management method according to the present embodiment may specifically include the following steps:

S501: receiving a database cluster service creation request carrying an ID of the application and sent by the database management platform;

S502: configuring, for the application, a plurality of nodes through which the application access a corresponding database cluster;

S503: returning information of the plurality of nodes which are configured for the application and through which the application access the corresponding database cluster to the database management platform, so that the database management platform builds the management information of the database cluster of the application.

For example, step S502 may specifically be configuring, for the application, access entries, proxies, storage slices and storage nodes through which the application access the corresponding database cluster.

It needs to be appreciated that when the step S502 of configuring, for the application, the access entries, proxies, storage slices and storage nodes through which the application access the corresponding database cluster is performed, the numbers of nodes such as the access entries, proxies, storage slices and storage nodes may be configured.

For example, it is possible to configure for the application, by a preset rule, a first preset number of access entries, a second preset number of proxies, a third preset number of storage slices and a fourth preset number of storage nodes in respective storage allocations through which the application accesses the corresponding database cluster. Specifically, the first preset number, the second preset number, the third preset number and the fourth preset number all are default numbers.

In addition, optionally, the database cluster service creation request received in step S501 and sent by the database management platform may also carry the numbers of the access entries, proxies, storage slices and storage nodes in respective storage allocations. At this time, upon configuration at step S502, it is possible to, according to the numbers of the access entries, proxies, storage slices and storage nodes in respective storage allocations carried in the database cluster service creation request, configure, for the application, a respective number of access entries, a respective number of proxies, a respective number of storage slices and a respective number of storage nodes in the storage allocations through which the application accesses the corresponding database cluster.

A subject for executing the database-based management method of the present embodiment is still the task management platform. The present embodiment differs from the embodiment shown in FIG. 2 in that the technical solution of the present disclosure is described on the side of the database management platform in the embodiment shown in FIG. 2, whereas the technical solution of the present disclosure is described on the side of the task management platform in the present embodiment. A specific implementation manner of the technical solution of the present embodiment is completely identical with the embodiment shown in FIG. 2. For details, please refer to the depictions of the embodiment shown in FIG. 2. No details will be provided here.

According to the technical solution of the database-based management method of the present embodiment, it is possible to assist the database management platform in configuring for the application the plurality of nodes through the application accesses the corresponding database cluster, and upon completion of the configuring, return information of the plurality of nodes which are configured for the application and through which the application access the corresponding database cluster to the database management platform, so that the database management platform can manage databases more effectively and can effectively improve the management efficiency of the databases.

Figure 6:
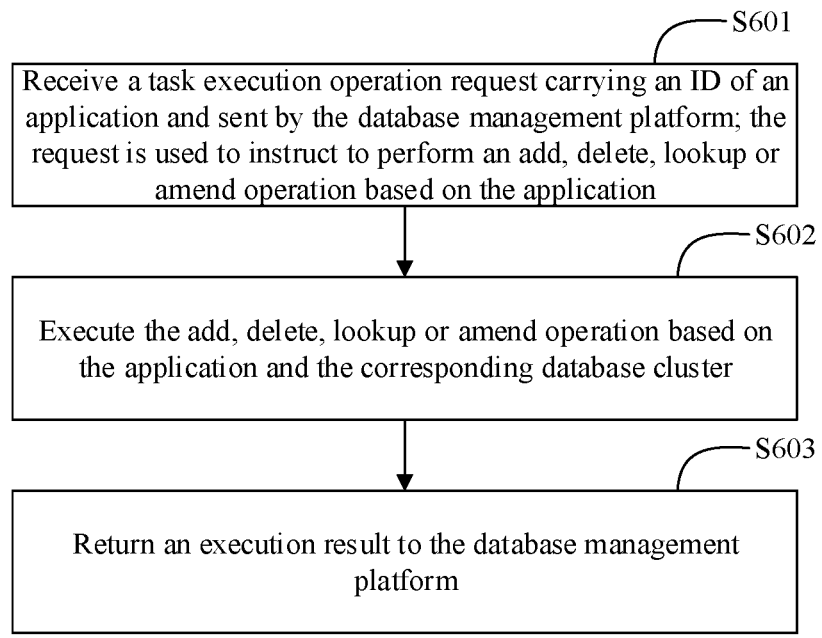
FIG. 6 illustrates a schematic diagram of a sixth embodiment according to the present disclosure.

FIG. 6 illustrates a schematic diagram of a sixth embodiment according to the present disclosure. As shown in FIG. 6, the technical solution of the database-based management method of the present embodiment will be further introduced in more detail on the basis of the above technical solution of the embodiment shown in FIG. 4. As shown in FIG. 6, the database-based management method according to the present embodiment may specifically include the following steps:

S601: receiving a task execution operation request carrying an ID of an application and sent by the database management platform; the task execution operation request is used to instruct to perform an add, delete, lookup or amend operation based on the application;

S602: executing the add, delete, lookup or amend operation based on the application and the corresponding database cluster;

S603: returning an execution result to the database management platform.

A subject for executing the database-based management method of the present embodiment is still the task management platform. The present embodiment differs from the embodiment shown in FIG. 3 in that the technical solution of the present disclosure is described on the side of the database management platform in the embodiment shown in FIG. 3, whereas the technical solution of the present disclosure is described on the side of the task management platform in the present embodiment. A specific implementation manner of the technical solution of the present embodiment is completely identical with the embodiment shown in FIG. 3. For details, please refer to the depictions of the embodiment shown in FIG. 3. No details will be provided here.

For example, when the number of the plurality of nodes through which the application accesses the database cluster as configured in the above step S502 is improper, adjustment may be made subsequently based on the add, delete, lookup or amend operation of the present embodiment.

According to the technical solution of the database-based management method of the present embodiment, it is possible to assist the database management platform in executing the task execution operation such as add, delete, lookup or amend, and upon completion of the operation, retuning the execution result to the database management platform, so that the database management platform can manage databases more effectively and can effectively improve the management efficiency of the databases.

Figure 7:
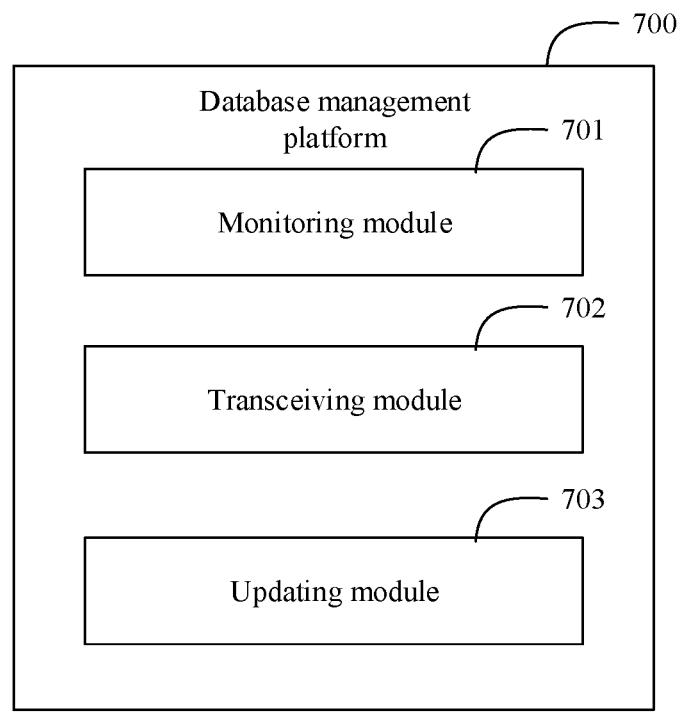
FIG. 7 illustrates a schematic diagram of a seventh embodiment according to the present disclosure.

FIG. 7 illustrates a schematic diagram of a seventh embodiment according to the present disclosure. As shown in FIG. 7, the present embodiment provides a database management platform 700, comprising:

a monitoring module 701 configured to monitor a plurality of nodes through which an application accesses a corresponding database cluster based on pre-built management information of the corresponding database cluster of the application;

a transceiving module 702 configured to, when an abnormal node appears in the plurality of nodes, send a node creation request carrying information of the abnormal node to a task management platform, to create an alternative node with the same function to replace the abnormal node;

the transceiving module 702 further configured to receive information of the created alternative node returned from the task management platform;

an updating module 703 configured to, based on the information of the alternative node and the information of the abnormal node, update the management information of the database cluster of the application.

Principles employed by database management platform 700 of the present embodiment to implement database-based management by using the above modules and the resultant technical effects are the same as those of the above relevant method embodiments. For particulars, please refer to the depictions of the aforesaid relevant method embodiments, and no detailed depictions will be presented here.

Figure 8:
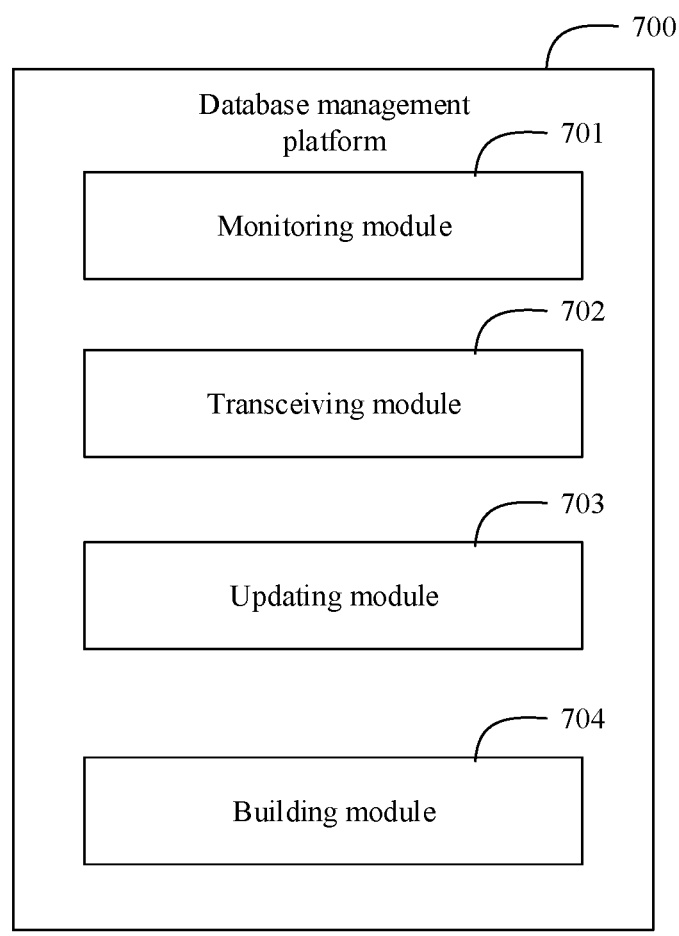
FIG. 8 illustrates a schematic diagram of an eighth embodiment according to the present disclosure.

FIG. 8 illustrates a schematic diagram of an eighth embodiment according to the present disclosure. As shown in FIG. 8, the database management platform 700 of the present embodiment will be further described in more detail on the basis of the technical solution of the embodiment shown in FIG. 7.

As shown in FIG. 8, the database management platform 700 of the present embodiment further comprises:

a building module 704 configured to build the management information of the database cluster of the application based on the information of the plurality of nodes which are configured for the application and through which the application accesses the corresponding database cluster.

Further optionally, the building module 704 is specifically configured to:

build the management information of the database cluster of the application based on the information of access entries, access proxies, storage slices and storage nodes which are configured for the application and through which the application accesses the corresponding database cluster.

Furthermore optionally, in the database management platform 700 of the present embodiment, the monitoring module 701 is specifically configured to:

monitor the access entries, access proxies, storage slices and storage nodes through which the application accesses the corresponding database cluster, based on the pre-built management information of the database cluster of the application.

Further optionally, in the database management platform 700 in the present embodiment:

the transceiving module 702 is further configured to receive a database cluster service creation request sent by the application;

the transceiving module 702 is further configured to send the database cluster service creation request carrying an ID of the application to the task management platform, so that the task management platform configures for the application the plurality of nodes through which the application accesses a corresponding database cluster;

the transceiving module 702 is further configured to receive, from the task management platform, information of the plurality of nodes which are configured for the application and through which the application accesses the corresponding database cluster;

the building module 704 is further configured to build management information of the database cluster of the application based on the information of the plurality of nodes which are configured for the application and through which the application accesses the corresponding database cluster.

Further optionally, in the database management platform 700 in the present embodiment, the transceiving module 702 is specifically configured to:

receive, from the task management platform, information of the access entries, access proxies, storage slices and storage nodes which are configured for the application and through which the application accesses the corresponding database cluster.

Further optionally, the database cluster service creation request sent by the application carries the numbers of the access entries, access proxies, storage slices and/or storage nodes.

Further optionally, in the database management platform 700 in the present embodiment, the transceiving module 702 is further configured to:

receive an add, delete, lookup or amend operation sent by the application;

send a corresponding task execution operation request to the task management platform based on the add, delete, lookup or amend operation sent by the application;

receive an execution result of the task execution operation returned by the task management platform;

return the execution result of the task execution operation to the application.

Further optionally, in the database management platform 700 in the present embodiment, the updating module 703 is further configured to:

if the add, delete, lookup or amend operation of the application involves the nodes through which the application accesses the corresponding database cluster, update the management information of the database cluster of the application based on the execution result of the task execution operation.

Principles employed by database management platform 700 of the present embodiment to implement database-based management by using the above modules and the resultant technical effects are the same as those of the above relevant method embodiments. For particulars, please refer to the depictions of the aforesaid relevant method embodiments, and no detailed depictions will be presented here.

Figure 9:
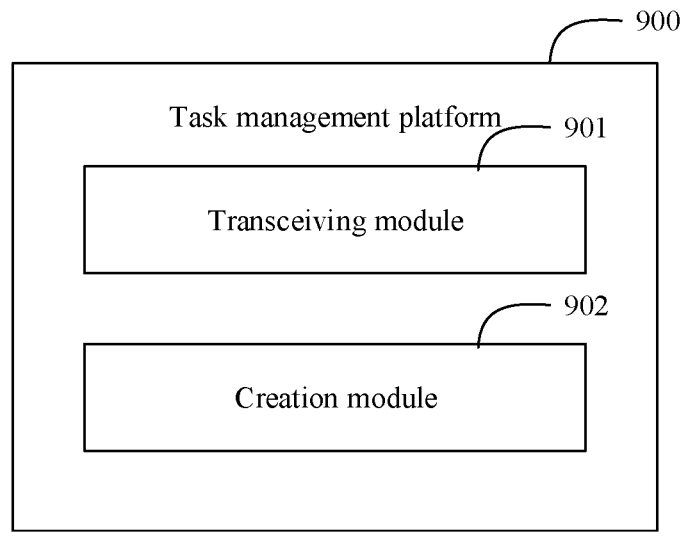
FIG. 9 illustrates a schematic diagram of a ninth embodiment according to the present disclosure.

FIG. 9 illustrates a schematic diagram of a ninth embodiment according to the present disclosure. As shown in FIG. 9, the present embodiment provides a task management platform 900, comprising:

a transceiving module 901 configured to receive a node creation request carrying information of an abnormal node and sent by the database management platform; the node creation request is sent by the database management platform upon determining there is the abnormal node upon monitoring a plurality of nodes through which the application access the corresponding database cluster based on pre-built management information of the database cluster of the application;

a creation module 902 configured to create an alternative node with the same function for the application according to the information of the abnormal node, to replace the abnormal node;

the transceiving module 901 further configured to return information of the created alternative node to the database management platform so that the database management platform updates the management information of the database cluster of the application.

Principles employed by task management platform 900 of the present embodiment to implement database-based management by using the above modules and the resultant technical effects are the same as those of the above relevant method embodiments. For particulars, please refer to the depictions of the aforesaid relevant method embodiments, and no detailed depictions will be presented here.

Figure 10:
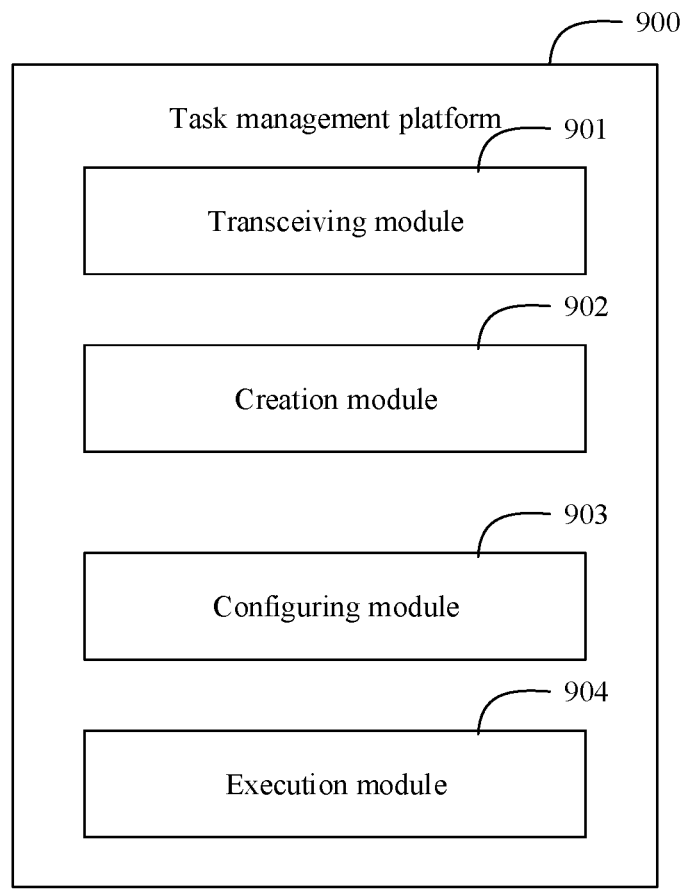
FIG. 10 illustrates a schematic diagram of a tenth embodiment according to the present disclosure.

FIG. 10 illustrates a schematic diagram of a tenth embodiment according to the present disclosure. As shown in FIG. 10, the task management platform 900 of the present embodiment will be further described in more detail on the basis of the technical solution of the embodiment shown in FIG. 9.

In the task management platform 900 in the present embodiment, the creation module 902 is configured to execute at least one type of the following: creating an alternative access entry for the application according to the information of an abnormal access entry, to replace the abnormal access entry;

according to information of an abnormal access proxy, selecting an access proxy from a set of access proxies to which the abnormal access proxy belongs as an alternative proxy, to replace the abnormal access proxy;

according to information of an abnormal storage slice, reconstructing a storage slice identical with the abnormal storage slice as an alternative storage slice, to replace the abnormal storage slice;

if a storage node in the storage slice as a master node becomes abnormal, obtaining a slave node from the storage slice and updating the slave node as a new master node, to replace the abnormal master node; and if a storage node in the storage slice as a slave node becomes abnormal, reconstructing a slave node in the storage slice to replace the abnormal slave node.

Further optionally, as shown in FIG. 10, the task management platform 900 in the present embodiment further comprises a configuring module 903;

the transceiving module 901 is further configured to receive a database cluster service creation request carrying an ID of the application and sent by the database management platform;

the configuring module 903 is configured to configure, for the application, a plurality of nodes through which the application access a corresponding database cluster;

the transceiving module 901 is further configured to return information of the plurality of nodes which are configured for the application and through which the application access the corresponding database cluster to the database management platform, so that the database management platform builds the management information of the database cluster of the application.

Further optionally, the configuring module 903 is specifically configured to: configure, for the application, the access entries, access proxies, storage slices and storage nodes through which the application access the corresponding database cluster.

Further optionally, the configuring module 903 is specifically configured to:

configure for the application, by a preset rule, a first preset number of access entries, a second preset number of access proxies, a third preset number of storage slices and a fourth preset number of storage nodes in respective storage allocations through which the application accesses the corresponding database cluster;

according to the numbers of the access entries, access proxies, storage slices and storage nodes in respective storage allocations carried in the database cluster service creation request, configure for the application a respective number of access entries, a respective number of access proxies, a respective number of storage slices and a respective number of storage nodes in the respective storage allocations through which the application accesses the corresponding database cluster.

Further optionally, as shown in FIG. 10, the task management platform 900 in the present embodiment further comprises an execution module 904;

the transceiving module 901 is further configured to receive a task execution operation request carrying an ID of the application and sent by the database management platform; the task execution operation request is used to instruct to perform an add, delete, lookup or amend operation based on the application;

the execution module 904 is configured to execute the add, delete, lookup or amend operation based on the application and the corresponding database cluster;

the transceiving module 901 is further configured to return an execution result to the database management platform.

Principles employed by task management platform 900 of the present embodiment to implement database-based management by using the above modules and the resultant technical effects are the same as those of the above relevant method embodiments. For particulars, please refer to the depictions of the aforesaid relevant method embodiments, and no detailed depictions will be presented here.

According to embodiments of the present disclosure, the present disclosure further provides an electronic device and a readable storage medium.

Figure 11:
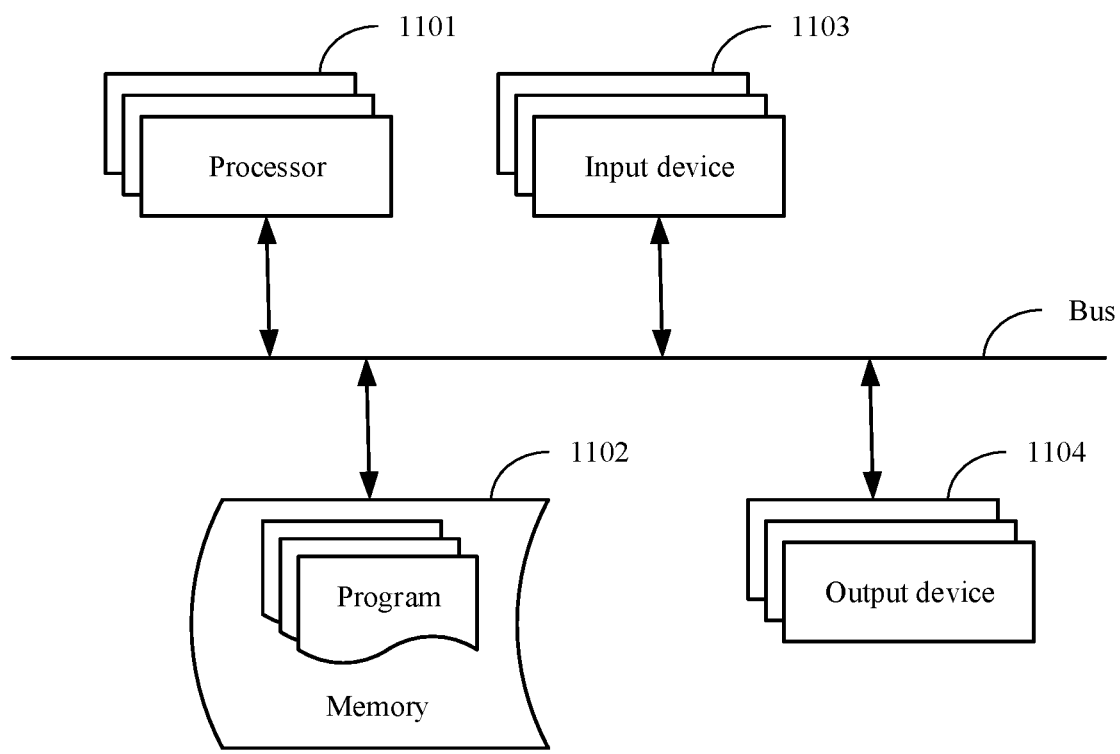
FIG. 11 illustrates a block diagram of an electronic device for implementing a database-based management method according to embodiments of the present disclosure.

As shown in FIG. 11, it shows a block diagram of an electronic device for implementing the database-based management method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 11, the electronic device comprises: one or more processors 1101, a memory 1102, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in or on the memory to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 1101 is taken as an example in FIG. 11.

The memory 1102 is a non-transitory computer-readable storage medium provided by the present disclosure. The memory stores instructions executable by at least one processor, so that the at least one processor executes the database-based management method according to the present disclosure. The non-transitory computer-readable storage medium of the present disclosure stores computer instructions, which are used to cause a computer to execute the database-based management method according to the present disclosure.

The memory 1102 is a non-transitory computer-readable storage medium and can be used to store non-transitory software programs, non-transitory computer executable programs and modules, such as program instructions/modules (e.g., relevant modules shown in FIG. 7 through FIG. 10) corresponding to the database-based management method in embodiments of the present disclosure. The processor 1101 executes various functional applications and data processing of the server, i.e., implements the database-based management method in the above method embodiments, by running the non-transitory software programs, instructions and modules stored in the memory 1102.

The memory 1102 may include a storage program region and a storage data region, wherein the storage program region may store an operating system and an application program needed by at least one function; the storage data region may store data created by the use of the electronic device for implementing the database-based management method. In addition, the memory 1102 may include a high-speed random access memory, and may also include a non-transitory memory, such as at least one magnetic disk storage device, a flash memory device, or other non-transitory solid-state storage device. In some embodiments, the memory 1102 may optionally include a memory remotely arranged relative to the processor 1101, and these remote memories may be connected to the electronic device for implementing the database-based management method through a network. Examples of the above network include, but are not limited to, the Internet, an intranet, a local area network, a mobile communication network, and combinations thereof.

The electronic device for implementing the database-based management method may further include an input device 1103 and an output device 1104. The processor 1101, the memory 1102, the input device 1103 and the output device 1104 may be connected through a bus or in other manners. In FIG. 11, the connection through the bus is taken as an example.

The input device 1103 may receive inputted numeric or character information and generate key signal inputs related to user settings and function control of the electronic device for implementing the database-based management method, and may be an input device such as a touch screen, keypad, mouse, trackpad, touchpad, pointing stick, one or more mouse buttons, trackball and joystick. The output device 1104 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a proxies component (e.g., an application server), or that includes a front end component (e.g., a client computer having a graphical user interface or a Web browser through which a user may interact with an implementation of the systems and techniques described here), or any combination of such back end, proxies, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to the technical solutions of embodiments of the present disclosure, a plurality of nodes through which all applications access the corresponding database cluster may be monitored, and when the abnormal node appears, the management information of the database cluster of applications can be updated in time based on the information of the created alternative node replacing the abnormal node, to facilitate continuing to monitor a plurality of nodes through which the applications access the corresponding database cluster to ensure that the applications can normally access the corresponding database cluster. In the present embodiment, only one set of database management platform is needed no matter whether the architectures of database clusters corresponding to the applications are the same. The above solution can be used to manage all applications simultaneously and effectively improve the management efficiency of the databases. Furthermore, different database architectures do not require development of different database management platforms, which can effectively save the development cost and facilitate iteration and innovation of the database management platform.

According to the technical solutions of embodiments of the present disclosure, it is possible to assist the database management platform in processing a task operation, and feeding back an execution result of the task operation to the database management platform so that the database management platform can manage the databases more effectively and thereby effectively improve the management efficiency of the databases.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A database-based management method, wherein the method comprises:

building management information of a database cluster of an application based on information of access entries, access proxies, storage slices and storage nodes which are configured for the application and through which the application accesses a corresponding database cluster;

monitoring the access entries, access proxies, storage slices and storage nodes through which the application accesses the corresponding database cluster, based on the management information of the database cluster of the application, wherein the access entry is an entry configured for the application to access the corresponding database cluster, the information of the access entry corresponds to a set of access proxies and a relationship of the access proxies in the set of access proxies is a peer relationship, and the database cluster is divided into a plurality of storage slices and a plurality of storage nodes is provided in each storage slice, and data stored in each storage node is consistent;

when an abnormal node appears in the plurality of nodes, sending a node creation request carrying information of the abnormal node to a task management platform, to create an alternative node with the same function to replace the abnormal node, wherein the creating an alternative node with the same function for the application according to the information of the abnormal node, to replace the abnormal node comprises at least one type of the following:

creating an alternative access entry for the application according to the information of an abnormal access entry, to replace the abnormal access entry;

according to information of an abnormal access proxy, selecting an access proxy from a set of access proxies to which the abnormal access proxy belongs as an alternative proxy, to replace the abnormal access proxy;

according to information of an abnormal storage slice, reconstructing a storage slice identical with the abnormal storage slice as an alternative storage slice, to replace the abnormal storage slice;

when a storage node in the storage slice as a master node becomes abnormal, obtaining a slave node from the storage slice and updating the slave node as a new master node, to replace the abnormal master node; and when a storage node in the storage slice as a slave node becomes abnormal, reconstructing a slave node in the storage slice to replace the abnormal slave node;

receiving information of the created alternative node returned from the task management platform;

updating the management information of the database cluster of the application based on the information of the alternative node and the information of the abnormal node, and monitoring the access entries, access proxies, storage slices and storage nodes through which the application accesses the corresponding database cluster, based on the updated management information of the database cluster of the application.

2. The method according to claim 1, wherein before the step of monitoring a plurality of nodes through which an application accesses a corresponding database cluster based on pre-built management information of the corresponding database cluster of the application, the method further comprises:

receiving a database cluster service creation request sent by the application;

sending the database cluster service creation request carrying an ID-identification of the application to the task management platform, so that the task management platform configures for the application the plurality of nodes through which the application accesses a corresponding database cluster;

receiving, from the task management platform, information of the plurality of nodes which are configured for the application and through which the application accesses the corresponding database cluster;

building the management information of the database cluster of the application based on the information of the plurality of nodes which are configured for the application and through which the application accesses the corresponding database cluster.

3. The method according to claim 2, wherein the receiving, from the task management platform, information of the plurality of nodes which are configured for the application and through which the application accesses the corresponding database cluster comprises:

receiving, from the task management platform, information of the access entries, access proxies, storage slices and storage nodes which are configured for the application and through which the application accesses the corresponding database cluster.

4. The method according to claim 3, wherein the database cluster service creation request sent by the application carries the numbers of the access entries, access proxies, storage slices and/or storage nodes.

5. The method according to claim 1, wherein the method further comprises:

receiving an add, delete, lookup or amend operation sent by the application;

sending a corresponding task execution operation request to the task management platform based on the add, delete, lookup or amend operation sent by the application;

receiving an execution result of the task execution operation returned by the task management platform;

returning the execution result of the task execution operation to the application.

6. The method according to claim 5, wherein when the add, delete, lookup or amend operation of the application involves the nodes through which the application accesses the corresponding database cluster, after receiving the execution result of the task execution operation returned by the task management platform, the method further comprises:

updating the management information of the database cluster of the application based on the execution result of the task execution operation.

7. The method according to claim 1, wherein the method further comprises:

receiving an add, delete, lookup or amend operation sent by the application;

sending a corresponding task execution operation request to the task management platform based on the add, delete, lookup or amend operation sent by the application;

receiving an execution result of the task execution operation returned by the task management platform;

returning the execution result of the task execution operation to the application.

8. The method according to claim 1, wherein the method further comprises:

receiving an add, delete, lookup or amend operation sent by the application;

sending a corresponding task execution operation request to the task management platform based on the add, delete, lookup or amend operation sent by the application;

receiving an execution result of the task execution operation returned by the task management platform;

returning the execution result of the task execution operation to the application.

9. The method according to claim 1, wherein the method further comprises:

receiving an add, delete, lookup or amend operation sent by the application;

sending a corresponding task execution operation request to the task management platform based on the add, delete, lookup or amend operation sent by the application;

receiving an execution result of the task execution operation returned by the task management platform;

returning the execution result of the task execution operation to the application.

10. A database-based management method, wherein the method comprises:

receiving a node creation request carrying information of an abnormal node and sent by a database management platform; the node creation request is sent by the database management platform upon determining there is the abnormal node upon monitoring a plurality of nodes through which an application accesses a corresponding database cluster based on pre-built management information of the database cluster of the application;

creating an alternative node with the same function for the application according to the information of the abnormal node, to replace the abnormal node;

returning information of the created alternative node to the database management platform so that the database management platform updates the management information of the database cluster of the application, wherein the creating an alternative node with the same function for the application according to the information of the abnormal node, to replace the abnormal node comprises at least one type of the following:

creating an alternative access entry for the application according to the information of an abnormal access entry, to replace the abnormal access entry;

according to information of an abnormal access proxy, selecting an access proxy from a set of access proxies to which the abnormal access proxy belongs as an alternative proxy, to replace the abnormal access proxy;

according to information of an abnormal storage slice, reconstructing a storage slice identical with the abnormal storage slice as an alternative storage slice, to replace the abnormal storage slice;

when a storage node in the storage slice as a master node becomes abnormal, obtaining a slave node from the storage slice and updating the slave node as a new master node, to replace the abnormal master node; and when a storage node in the storage slice as a slave node becomes abnormal, reconstructing a slave node in the storage slice to replace the abnormal slave node.

11. The method according to claim 10, wherein before receiving a node creation request carrying information of an abnormal node and sent by a database management platform, the method further comprises:

receiving a database cluster service creation request carrying an identification of the application and sent by the database management platform;

configuring for the application the plurality of nodes through which the application accesses the corresponding database cluster;

returning information of the plurality of nodes which are configured for the application and through which the application accesses the corresponding database cluster to the database management platform, so that the database management platform builds the management information of the database cluster of the application.

12. The method according to claim 11, wherein the configuring for the application the plurality of nodes through which the application accesses the corresponding database cluster comprises:

configuring, for the application, access entries, access proxies, storage slices and storage nodes through which the application accesses the corresponding database cluster.

13. The method according to claim 12, wherein the configuring, for the application, access entries, access proxies, storage slices and storage nodes through which the application accesses the corresponding database cluster comprises:

configuring for the application, by a preset rule, a first preset number of access entries, a second preset number of access proxies, a third preset number of storage slices and a fourth preset number of storage nodes in respective storage allocations through which the application accesses the corresponding database cluster;

configuring for the application a respective number of access entries, a respective number of access proxies, a respective number of storage slices and a respective number of storage nodes in the respective storage allocations through which the application accesses the corresponding database cluster, according to the numbers of the access entries, access proxies, storage slices and storage nodes in respective storage allocations carried in the database cluster service creation request.

14. The method according to claim 10, wherein the method further comprises:

receiving a task execution operation request carrying an identification of the application and sent by the database management platform; the task execution operation request is used to instruct to perform an add, delete, lookup or amend operation based on the application;

executing the add, delete, lookup or amend operation based on the application and the corresponding database cluster;

returning an execution result to the database management platform.

15. An electronic device, comprising:

at least one processor; and a memory communicatively connected with the at least one processor;

wherein the memory stores instructions executable by the at least one processor, and the instructions are executed by the at least one processor to enable the at least one processor to perform a database-based management method, wherein the database-based management method comprises:

building management information of a database cluster of an application based on information of access entries, access proxies, storage slices and storage nodes which are configured for the application and through which the application accesses a corresponding database cluster;

monitoring the access entries, access proxies, storage slices and storage nodes through which the application accesses the corresponding database cluster, based on the management information of the database cluster of the application, wherein the access entry is an entry configured for the application to access the corresponding database cluster, the information of the access entry corresponds to a set of access proxies and a relationship of the access proxies in the set of access proxies is a peer relationship, and the database cluster is divided into a plurality of storage slices and a plurality of storage nodes is provided in each storage slice, and data stored in each storage node is consistent;

when an abnormal node appears in the plurality of nodes, sending a node creation request carrying information of the abnormal node to a task management platform, to create an alternative node with the same function to replace the abnormal node, wherein the creating an alternative node with the same function for the application according to the information of the abnormal node, to replace the abnormal node comprises at least one type of the following:

creating an alternative access entry for the application according to the information of an abnormal access entry, to replace the abnormal access entry;

according to information of an abnormal access proxy, selecting an access proxy from a set of access proxies to which the abnormal access proxy belongs as an alternative proxy, to replace the abnormal access proxy;

according to information of an abnormal storage slice, reconstructing a storage slice identical with the abnormal storage slice as an alternative storage slice, to replace the abnormal storage slice;

when a storage node in the storage slice as a master node becomes abnormal, obtaining a slave node from the storage slice and updating the slave node as a new master node, to replace the abnormal master node; and when a storage node in the storage slice as a slave node becomes abnormal, reconstructing a slave node in the storage slice to replace the abnormal slave node;

receiving information of the created alternative node returned from the task management platform;

updating the management information of the database cluster of the application based on the information of the alternative node and the information of the abnormal node, and monitoring the access entries, access proxies, storage slices and storage nodes through which the application accesses the corresponding database cluster, based on the updated management information of the database cluster of the application.

16. A non-transitory computer readable storage medium with computer instructions stored thereon, wherein the computer instructions are used for causing a computer to perform a database-based management method, wherein the database-based management method comprises:
building management information of a database cluster of an application based on information of access entries, access proxies, storage slices and storage nodes which are configured for the application and through which the application accesses a corresponding database cluster;
monitoring the access entries, access proxies, storage slices and storage nodes through which the application accesses the corresponding database cluster, based on the management information of the database cluster of the application, wherein the access entry is an entry configured for the application to access the corresponding database cluster, the information of the access entry corresponds to a set of access proxies and a relationship of the access proxies in the set of access proxies is a peer relationship, and the database cluster is divided into a plurality of storage slices and a plurality of storage nodes is provided in each storage slice, and data stored in each storage node is consistent;
when an abnormal node appears in the plurality of nodes, sending a node creation request carrying information of the abnormal node to a task management platform, to create an alternative node with the same function to replace the abnormal node, wherein the creating an alternative node with the same function for the application according to the information of the abnormal node, to replace the abnormal node comprises at least one type of the following:
creating an alternative access entry for the application according to the information of an abnormal access entry, to replace the abnormal access entry;
according to information of an abnormal access proxy, selecting an access proxy from a set of access proxies to which the abnormal access proxy belongs as an alternative proxy, to replace the abnormal access proxy;
according to information of an abnormal storage slice, reconstructing a storage slice identical with the abnormal storage slice as an alternative storage slice, to replace the abnormal storage slice;
when a storage node in the storage slice as a master node becomes abnormal, obtaining a slave node from the storage slice and updating the slave node as a new master node, to replace the abnormal master node; and
when a storage node in the storage slice as a slave node becomes abnormal, reconstructing a slave node in the storage slice to replace the abnormal slave node;
receiving information of the created alternative node returned from the task management platform;
updating the management information of the database cluster of the application based on the information of the alternative node and the information of the abnormal node, and monitoring the access entries, access proxies, storage slices and storage nodes through which the application accesses the corresponding database cluster, based on the updated management information of the database cluster of the application.

* * * * *